United States Patent
Iwasa et al.

(10) Patent No.: US 7,807,243 B2
(45) Date of Patent: Oct. 5, 2010

(54) LABEL FOR IN-MOLD FORMING HAVING EXCELLENT DELABELING PROPERTY, AND CONTAINER WITH THE LABEL

(75) Inventors: Yasuo Iwasa, Ibaraki (JP); Masaki Shiina, Ibaraki (JP); Takatoshi Nishizawa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 506 days.

(21) Appl. No.: 11/516,658

(22) Filed: Sep. 7, 2006

(65) Prior Publication Data

US 2008/0063835 A1    Mar. 13, 2008

(51) Int. Cl.
*B29D 22/00*   (2006.01)
*B32B 9/00*    (2006.01)
*B32B 3/10*    (2006.01)
*B29C 47/00*   (2006.01)
*B29C 47/88*   (2006.01)
*B29C 43/22*   (2006.01)
*B28B 3/20*    (2006.01)
*D01D 5/12*    (2006.01)

(52) U.S. Cl. ............... 428/35.7; 428/40.1; 428/137; 156/244.11; 156/244.24; 264/176.1; 264/210.1; 264/211.12; 264/509

(58) Field of Classification Search ............ 428/35.7, 428/40.1, 137; 156/245, 244.11, 244.24; 264/173.16, 259, 176.1, 210.1, 211.12, 509
See application file for complete search history.

(56) References Cited

U.S. PATENT DOCUMENTS

| 4,986,866 | A |   | 1/1991 | Ohba et al. |
| 5,332,542 | A |   | 7/1994 | Yamanaka et al. |
| 5,811,163 | A |   | 9/1998 | Ohno et al. |
| 6,726,969 | B1 |   | 4/2004 | Balaji et al. |
| 2002/0050319 | A1 | * | 5/2002 | Nishizawa et al. .......... 156/245 |
| 2004/0096612 | A1 | * | 5/2004 | Balaji et al. ............... 428/35.7 |
| 2005/0191449 | A1 | * | 9/2005 | Funato et al. .............. 428/34.1 |
| 2007/0003777 | A1 |   | 1/2007 | Iwasa et al. |

* cited by examiner

*Primary Examiner*—Rena L Dye
*Assistant Examiner*—James Yager
(74) *Attorney, Agent, or Firm*—Oblon, Spivak, McClelland, Maier & Neustadt, L.L.P.

(57) ABSTRACT

The invention relates to: a label for in-mold forming having excellent suitability for delabeling which comprises a thermoplastic resin film base layer (I) and a heat-sealable resin layer (II) and in which the heat-sealable resin layer (II) has an adhesion strength as measured at 23° C. of 300 gf/15 mm or higher and an adhesion strength as measured at 90° C. of 290 gf/15 mm or lower; and a labeled resin container having the label bonded thereto.

17 Claims, No Drawings

LABEL FOR IN-MOLD FORMING HAVING EXCELLENT DELABELING PROPERTY, AND CONTAINER WITH THE LABEL

FIELD OF THE INVENTION

The present invention relates to a label having excellent suitability for delabeling which is for use in in-mold forming in which the label is set beforehand in a mold so that a printed surface side of the label comes into contact with the mold wall surface and a labeled container is produced by blow molding with introducing a parison of a molten thermoplastic resin into the mold, by injection-molding a molten thermoplastic resin in the mold, or by subjecting a sheet of a molten thermoplastic resin to vacuum forming or pressure forming with the mold. The invention further relates to a resin container bearing the label, processes for producing the label, and a process for producing the labeled container.

BACKGROUND OF THE INVENTION

For integrally molding a labeled resin container, a process has been used which comprises inserting a blank or label into a mold beforehand and then molding a container in the mold by injecting molding, blow molding, pressure-difference molding, foam molding, or the like to label the container for decoration, etc. (see JP-A-58-69015 and EP-A-254,923). Known labels for use in such in-mold forming include labels comprising a resin film printed by gravure printing, labels comprising a synthetic paper printed by multicolor offset printing (see, for example, JP-B-2-7814 and JP-A-2-84319), and aluminum labels obtained by laminating a high-pressure-process low-density polyethylene or an ethylene/vinyl acetate copolymer to the back side of an aluminum foil and printing the front side of the foil by gravure printing.

In recent years, recycling techniques contributing to environmental conservation are attracting attention. Under these circumstances, when only the resinous container components after the molding or after the contents have been used up are recycled in the in-mold forming, it is necessary to conduct the step of stripping off the labels at a high temperature (hereinafter referred to as delabeling). Labels employing branched low-density polyethylene as a heat-sealable resin have relatively satisfactory adhesion between the label and the container. However, when it is attempted to strip off these labels at a high temperature, the labels remain on the containers. Namely, these labels have poor suitability for delabeling. On the other hand, labels employing an ethylene/vinyl acetate copolymer or ethylene/acrylic acid copolymer having a low melting point as a heat-sealable resin have a problem that this resin has poor heat resistance and, hence, plated inner surfaces of the extruder and dies corrode.

SUMMARY OF THE INVENTION

An object of the invention is to provide a label for in-mold forming which gives labeled containers inhibited from suffering blistering in in-mold forming and has satisfactory suitability for high-temperature delabeling.

The invention relates to the following label for in-mold forming and processes for producing the label. The invention further relates to the following labeled resin container and process for producing the container.

1. A label for in-mold forming comprising a thermoplastic resin film base layer (I) and a heat-sealable resin layer (II), wherein the heat-sealable resin layer (II) has an adhesion strength as measured at 23° C. of 300 gf/15 mm or higher and an adhesion strength as measured at 90° C. of 290 gf/15 mm or lower.

2. The label for in-mold forming having excellent suitability for delabeling according to item 1 above, which is strippable by heating a container to which the label has been bonded to 90° C.

3. The label for in-mold forming according to item 1 or 2 above, wherein the heat-sealable resin layer (II) has a proportion of the heat of fusion in a range of temperatures below 90° C. as determined with a differential scanning calorimeter (DSC) of 70% or higher.

4. The label for in-mold forming according to item 3 above, wherein the heat-sealable resin layer (II) comprises a copolymer of ethylene and α-olefin having 3-20 carbon atoms, the copolymer having a melting point of 50-90° C. and having a proportion of the heat of fusion in a range of temperatures below 90° C. of 90% or higher.

5. The label for in-mold forming according to any one of items 1 to 4 above, which comprises the thermoplastic resin film base layer (I) and the heat-sealable resin layer (II) formed on one side of the base layer (I) and is to be bonded and united to a container through the heat-sealable resin layer (II).

6. The label for in-mold forming according to item 5 above, wherein the thermoplastic resin film base layer (I) is a uniaxially stretched layer.

7. The label for in-mold forming according to item 5 above, wherein the thermoplastic resin film base layer (I) is a biaxially stretched layer.

8. The label for in-mold forming according to item 5 above, wherein the thermoplastic resin film base layer (I) comprises a combination of a biaxially stretched layer and a uniaxially stretched layer.

9. The label for in-mold forming according to any one of items 5 to 8 above, wherein the heat-sealable resin layer (II) is a layer which has been stretched at least uniaxially.

10. The label for in-mold forming according to any one of items 5 to 9 above, wherein the heat-sealable resin layer (II) has been embossed.

11. The label for in-mold forming according to any one of items 5 to 10 above, wherein the heat-sealable resin layer (II) is a layer formed through coating.

12. The label for in-mold forming according to any one of items 1 to 11 above, which is opaque.

13. The label for in-mold forming according to any one of items 1 to 11 above, which is transparent.

14. The label for in-mold forming according to item 1 above, which has at least either of a hole and a slit.

15. A labeled resin container bearing the label for in-mold forming according to any one of items 1 to 11 above bonded thereto.

16. A process for producing the label for in-mold forming according to item 1 above, which comprises superposing the thermoplastic resin film base layer (I) and the heat-sealable resin layer (II) one on the other by a casting method in which these layers are coextruded through a multilayer die and then stretching the extrudate.

17. A process for producing the label for in-mold forming according to item 1 above, which comprises superposing the thermoplastic resin film base layer (I) and the heat-sealable resin layer (II) one on the other by a laminating method using plural dies and then stretching the laminate.

18. A process for producing the labeled resin container according to item 15 above, which comprises inserting the label for in-mold forming of claim 1 into a mold and then forming a container in the mold.

DETAILED DESCRIPTION OF THE INVENTION

The label for in-mold forming of the invention will be further explained below in detail.

Thermoplastic Resin Film Base Layer (I)

The thermoplastic resin film base layer (I) to be used in the invention is a layer comprising a thermoplastic resin. Examples of the thermoplastic resin to be used as or in the base layer (I) include films of polyolefin resins such as propylene resins, high-density polyethylene, medium-density polyethylene, poly(methyl-1-pentene), and ethylene/cycloolefin copolymers, poly(ethylene terephthalate) resins, poly(vinyl chloride) resins, polyamide resins such as nylon-6, nylon-6,6, nylon-6,10, and nylon-6,12, ABS resins, and ionomer resins. Preferred are thermoplastic resins having a melting point in the range of 130-280° C., such as propylene resins, high-density polyethylene, and poly(ethylene terephthalate) resins. These resins may be used as a mixture of two or more thereof.

It is preferred that the thermoplastic resin as the main component should have a melting point higher by at least 15° C. than the melting point of the polyolefin resin constituting the heat-sealable resin layer (II). Preferred of such resins are propylene resins from the standpoints of chemical resistance, cost, etc. The propylene resins include propylene homopolymers showing isotactic or syndiotactic stereoregularity and copolymers of propylene as the main component and α-olefin such as ethylene, buene-1, hexene-1, heptane-1, and 4-methylpentene-1. These copolymers may be bipolymers, terpolymers, or quadripolymers, and may be random copolymers or block copolymers.

Besides the thermoplastic resin, an inorganic fine powder and/or an organic filler is preferably incorporated into the thermoplastic resin film base layer (I). Examples of the inorganic fine powder include heavy calcium carbonate, light-weight calcium carbonate, calcined clay, talc, barium sulfate, diatomaceous earth, magnesium oxide, zinc oxide, titanium oxide, silicon oxide, a composite inorganic fine powder comprising hydroxyl-containing inorganic fine particles as cores, such as silica, and aluminum oxide or hydroxide surrounding the cores, and hollow glass beads. Examples thereof further include surface-treated powders obtained by treating such inorganic fine powders with various surface-treating agents. Of these, heavy calcium carbonate, calcined clay, and talc are preferred because they are inexpensive and bring about satisfactory moldability. Especially preferred is heavy calcium carbonate.

Examples of the organic filler include poly(ethylene terephthalate), poly(butylene terephthalate), polyamides, polycarbonates, poly(ethylene naphthalate), polystyrene, polymers and copolymers of acrylic or methacrylic esters, melamine resins, poly(ethylene sulfite), polyimides, poly (ethyl ether ketone), poly(phenylene sulfite), homopolymers of cycloolefins, and copolymers of a cycloolefin and ethylene. Of these, it is preferred to use a resin which has a higher melting point than the thermoplastic resin used and is incompatible with the resin. In the case where an olefin resin is used, it is preferred to use a member selected from poly(ethylene terephthalate), poly(butylene terephthalate), polyamides, polycarbonates, poly(ethylene naphthalate), polystyrene, homopolymers of cycloolefins, and copolymers of a cycloolefin and ethylene.

From the standpoint of a small calorific value in combustion, inorganic fine powders are preferred to organic fillers.

The average particle diameter of the inorganic fine powder to be used in the invention or the average dispersed-particle diameter of the organic filler to be used in the invention is preferably 0.01-30 μm, more preferably 0.1-20 μm, even more preferably 0.5-15 μm. The particle diameter thereof is preferably 0.1 μm or larger from the standpoint of ease of mixing with the thermoplastic resin. The particle diameter thereof is preferably 20 μm or smaller from the standpoint that the sheet, when stretched for forming voids therein and thereby improving printability, is less apt to suffer troubles such as breaking and a decrease in surface-layer strength.

The average particle diameter of the inorganic fine powder to be used in the invention can be determined in terms of the diameter of the particle corresponding to cumulative 50% (50%-cumulative particle diameter) as determined with, e.g., a particle analyzer such as laser diffraction type particle analyzer "Microtrac" (trade name; manufactured by Nikkiso Co., Ltd.). With respect to the particle diameter of an organic filler which has been dispersed in a thermoplastic resin by melt kneading and a dispersion operation, the particle diameter thereof may be determined by examining a section of the label with an electron microscope, measuring the diameters of at least ten particles, and averaging these particle diameters.

In the label of the invention, one member selected from those powders and fillers may be used alone or two or more thereof may be selected and used in combination. In the case of using a combination of two or more, this combination may comprise an inorganic fine powder and an organic filler.

When those fine powders are incorporated into a thermoplastic resin and the mixture is kneaded, additives can be added according to need, such as an antioxidant, ultraviolet stabilizer, dispersant, lubricant, compatibilizing agent, flame retardant, and coloring pigment. In the case where the label of the invention is to be used as a durable material, it is preferred to add an antioxidant, ultraviolet stabilizer, and the like. When an antioxidant is added, the amount of the antioxidant to be added is generally in the range of 0.001-1% by weight. Specifically, a stabilizer such as a sterically hindered phenol compound, a phosphorus compound, or an amine compound can be used. When an ultraviolet stabilizer is used, it is used in an amount generally in the range of 0.001-1% by weight. Specifically, a light stabilizer such as a sterically hindered amine, a benzotriazole compound, or a benzophenone compound can be used.

The dispersant and the lubricant are used, for example, for the purpose of dispersing an inorganic fine powder. The amount of the dispersant or lubricant to be used is generally in the range of 0.01-4% by weight. Specifically, use can be made of a silane coupling agent, higher fatty acid such as oleic acid or stearic acid, metal soap, poly(acrylic acid), poly(methacrylic acid), a salt of any of these, etc. In the case where an organic filler is used, the kind and amount of a compatibilizing agent are important because they govern the particle shape of the organic filler. Preferred examples of the compatibilizing agent for organic fillers include epoxy-modified polyolefins and maleic-acid-modified polyolefins. The amount of the compatibilizing agent to be added is preferably 0.05-10 parts by weight per 100 parts by weight of the organic filler.

In the case where the label is required to have transparency for making the color of the container prominent, the thermoplastic resin film base layer (I) is preferably as follows. Preferred examples of the base layer (I) include a stretched resin film comprising: a biaxially stretched film core layer (A) made of a resin composition comprising 0-5% by weight inorganic fine powder, 0-20% by weight high-density polyethylene, and 100-75% by weight propylene resin; a uniaxially stretched film front layer (B) bonded to one side of the core layer (A) and made of a resin composition comprising 1-30% by weight inorganic fine powder, 0-10% by weight high-density polyethylene, and 99-60% by weight propylene resin; and a uniaxially stretched film back layer (C) bonded to the core layer (A) on the side opposite to the front layer (B) and made of a resin composition comprising 1-30% by weight inorganic fine powder, 0-10% by weight high-density polyethylene, and 99-60% by weight propylene resin. Preferred examples thereof further include a stretched resin film comprising: a uniaxially stretched film core layer (A) made of a resin composition comprising 0-5% by weight inorganic fine powder, 0-20% by weight high-density polyethylene, and 100-75% by weight propylene resin; and a uniaxially stretched film front layer (B) bonded to one side of the core layer (A) and made of a resin composition comprising 1-30% by weight inorganic fine powder, 0-10% by weight high-density polyethylene, and 99-60% by weight propylene resin.

In those stretched-resin film base layers (I), printing is conducted on the front layer (B) side and the heat-sealable resin layer (II) is formed on the core layer (A) or back layer (C) side. Those stretched-resin film base layers (I) preferably have a density in the range of 0.85-1.02 g/cm$^3$. The thickness of the thermoplastic resin film base layer (I) described above is in the range of 20-250 μm, preferably 40-200 μm. In case where the thickness thereof is smaller than 20 μm, label insertion into a mold with a label inserter is apt to arouse troubles that the label is not fixed in a right position and the label rumples. Conversely, in case where the thickness of the base layer (I) exceeds 250 μm, the strength at the boundary part between the container and the label, molded by in-mold forming, is reduced and this container has poor strength in drop resistance. The thicknesses of those constituent layers are as follows. The thickness of the layer (A) is preferably 19-170 μm (more preferably 38-130 μm), that of the layer (B) is preferably 1-40 μm (more preferably 2-35 μm), and that of the layer (C) is preferably 0-40 μm (more preferably 0-35 μm).

Heat-Sealable Resin Layer (II)

As the heat-sealable resin layer, used is a layer which, when being used as a label for in-mold forming, has a strength of adhesion to the resin container as measured at 23° C. of 300 gf/15 mm or higher and a strength of adhesion to the resin container as measured at 90° C. of 290 gf/15 mm or lower. In case where the adhesion strength at 23° C. is lower than 300 gf/15 mm, adhesion between the resin container and the label during ordinary use is poor and label peeling or blistering is apt to occur. In case where the adhesion strength at 90° C. exceeds 290 gf/15 mm, the label is apt to remain on the container when the container is delabeled. Namely, this label has poor suitability for delabeling.

Preferably, the adhesion strength at 23° C. is in the range of 350-2,000 gf/15 mm and that at 90° C. is in the range of 1-290 gf/15 mm. Especially preferably, the adhesion strength at 23° C. is in the range of 400-1,000 gf/15 mm and that at 90° C. is in the range of 30-280 gf/15 mm.

It is preferred that the heat-sealable resin layer be one in which the proportion of the heat of fusion in a range of temperatures below 90° C. as determined with a DSC is 70% or higher. In case where the proportion thereof is lower than 70%, the label is apt to remain on the container when the labeled container is delabeled with heating at 90° C. Namely, this label has poor suitability for delabeling.

The heat-sealable resin layer preferably comprises a copolymer of ethylene and α-olefin having 3-20 carbon atoms (α-olefin resin) which has a melting point as measured with a DSC of 50-90° C. and has a proportion of the heat of fusion in a range of temperatures below 90° C., as determined with a DSC, of 90% or higher. Melting points of the α-olefin resin lower than 50° C. are undesirable because blocking is apt to occur during label production or in a printing step or when the cut label is in a packaged state. On the other hand, melting points thereof exceeding 90° C. are undesirable because the label employing this heat-sealable resin layer highly fusion-bonds to a blow-molded polyolefin resin and remains on the container. Namely, this label has poor suitability for delabeling. In case where the proportion of the heat of fusion in a range of temperatures below 90° C. is lower than 90%, the container bearing this label has poor delabeling properties in delabeling with short-time heating at 90° C.

The content of that copolymer in the heat-sealable resin layer is preferably 60% by weight or higher. In case where the content thereof is lower than 60% by weight, the performances described above tend to be difficult to regulate.

The α-olefin resin to be used as a component of the heat-sealable resin preferably is one which comprises as the main component an ethylene/α-olefin copolymer obtained by polymerization using a metallocene catalyst. Most suitable of such copolymers is a linear polyethylene resin obtained by copolymerizing 40-98% by weight ethylene and 60-2% by weight α-olefin(s) having 3-20 carbon atoms with the aid of a metallocene catalyst, in particular, a metallocene/aluminoxane catalyst or a catalyst comprising a metallocene compound such as that disclosed in, e.g., International Patent Publication WO 92/01723 and a compound which reacts with the metallocene compound to form a stable anion.

Such linear polyethylene resins obtained with a metallocene catalyst may be used either alone or as a mixture of two or more thereof. In the case where the heat-sealable resin comprises many thermoplastic resins, it is preferred that the α-olefin resin which contains ethylene and has 3-20 carbon atoms be the main component (the component contained in a highest proportion by weight).

In the invention, the proportion of the heat of fusion in a range of temperatures below 90° C. is one determined using the following equation (1).

Proportion of heat of fusion in range of temperatures below 90° C. (%)=100×(heat of fusion in range of temperatures below 90° C.)/(overall heat of fusion)　　(1)

Other known additives for resins can be added to the heat-sealable resin layer (II) in the invention at will as long as the addition thereof does not inhibit the desired heat sealability. Examples of the additives include a dye, nucleating agent, plasticizer, release agent, antioxidant, flame retardant, and ultraviolet absorber. The thickness of the heat-sealable resin layer (II) is in the range of 0.5-20 μm, preferably 1-5 μm. The thickness of the heat-sealable resin layer (II) should be 1 μm or larger in order for the layer (II) to melt during blow molding due to the heat of the molten polyethylene or polypropylene constituting, e.g., a parison to tenaciously fusion-bond the label to the container as a molded article. Thicknesses thereof exceeding 5 μm are undesirable because the label in this case curls and is difficult to fix to a mold.

As stated above, the heat-sealable resin layer of the label can be embossed as described in JP-A-2-84319 and JP-A-3-260689 in order to prevent blistering in blow molding. The embossed pattern preferably is a reversed-gravure type pattern having, for example, 5-200 lines per 2.54 cm formed by embossing.

For mixing the ingredients for constituting the label of the invention, various known methods can be used. Although the methods are not particularly limited, temperatures for mixing and time periods of mixing are suitably selected according to properties of the ingredients to be used. Examples thereof include the mixing of ingredients in the state of being dissolved or dispersed in a solvent and the melt kneading method. The melt kneading method attains a satisfactory production efficiency. Specific examples include: a method in which a thermoplastic resin in a powder or pellet form is mixed with an inorganic fine powder and/or an organic filler and with a dispersant by means of a Henschel mixer, ribbon blender, supermixer, or the like and the resultant mixture is melt-kneaded with a twin-screw kneading extruder, extruded into strands, and then cut to obtain pellets; and a method in which the mixture kneaded is extruded through a strand die in water and cut with a rotating blade attached to the die end. Examples thereof further include a method in which a dispersant in the form of a powder, liquid, or solution in either water or an organic solvent is mixed with an inorganic fine powder and/or organic filler and this mixture is then mixed with another ingredient such as, e.g., a thermoplastic resin.

The label of the invention can be produced by a combination of two or more of various techniques known to persons skilled in the art. Whatever methods the resin films were produced by, the label is within the scope of the invention as long as the resin films constituting the label satisfy the requirements specified in the claims.

For producing the label of the invention, use can be made of any of various known film production techniques or a combination of two or more thereof. Examples thereof include the casting method in which one or more molten resins are extruded into a sheet form with a single-layer or multilayer T-die connected to one or more screw extruders, the film-stretching method in which void generation by stretching is utilized, the rolling or calendaring method in which voids are generated during rolling, the expansion method in which a blowing agent is used, a method in which particles having voids are utilized, the inflation method, the solvent extraction method, and a method in which a component of a mixture is extracted with a solvent. Preferred of these is the film-stretching method.

Various known methods can be used for stretching. Stretching can be conducted at a temperature in a range suitable for the thermoplastic resin. Namely, when the resin is an amorphous resin, the temperature is not lower than the glass transition temperature of the thermoplastic resin used. When the resin is a crystalline resin, the temperature is in the range of from the glass transition temperature of amorphous parts of the resin to the melting point of crystalline parts thereof. Specifically, stretching can be conducted by longitudinal stretching utilizing peripheral-speed differences among rolls, transverse stretching utilizing a tenter oven, rolling, inflation stretching in which a tubular film is stretched with a mandrel, simultaneous biaxial stretching with a combination of a tenter oven and a linear motor, or the like.

Stretch ratio is not particularly limited, and is suitably determined while taking account of the intended use of the resin film of the invention, properties of the thermoplastic resin used, etc. For example, in the case where a propylene homopolymer or a copolymer thereof is used as the thermoplastic resin, the stretch ratio in uniaxial stretching is generally about 1.2-12, preferably 2-10, and that in biaxial stretching is generally 1.5-60, preferably 10-50, in terms of areal ratio. In the case of using other thermoplastic resins, the stretch ratio in uniaxial stretching is generally 1.2-10, preferably 2-7, and that in biaxial stretching is generally 1.5-20, preferably 4-12, in terms of areal ratio.

The stretching temperature may be a temperature lower by 2-160° C. than the melting point of the thermoplastic resin used. In the case where a propylene homopolymer or a copolymer thereof is used as the thermoplastic resin, the stretching temperature preferably is a temperature lower than the melting point of the resin by 2-60° C. In this case, the stretching speed is preferably 20-350 m/min. According to need, the film may be further subjected to a heat treatment at a high temperature.

The label of the invention can be regulated so as to be transparent or opaque according to need. When the label is transparent, it gives the impression that this label has been united with the container. When the label is opaque, the information printed on the label is easy to recognize. Whether the label is transparent or opaque can be judged based on the value of opacity of the label as measured in accordance with JIS-Z-8722. When the opacity thereof is in the range of 0-20%, the label is regarded as transparent. When the opacity thereof is in the range of 20-100%, excluding 20%, the label is regarded as opaque.

In the label of the invention, the surface printability of the thermoplastic resin film base layer (I) can be improved beforehand by an activation treatment according to need. The activation treatment comprises at least one treatment selected from corona discharge treatment, flame treatment, plasma treatment, glow discharge treatment, and ozone treatment. Preferred are corona treatment and flame treatment. The amount of energy to be used for corona treatment is generally 600-12,000 J/m$^2$ (10-200 W·min/m$^2$), preferably 1,200-9,000 J/m$^2$ (20-150 W·min/m$^2$). When the amount thereof is 600 J/m$^2$ (10 W·min/m$^2$) or larger, the effect of corona discharge treatment can be sufficiently obtained and the subsequent application of a surface modifier does not result in cissing. On the other hand, even when the energy amount is increased beyond 12,000 J/m$^2$ (200 W·min/m$^2$), the effect of the treatment cannot be enhanced any more. Consequently, an energy amount up to 12,000 J/m$^2$ (200 W·min/m$^2$) suffices for corona treatment. In the case of flame treatment, the amount of energy to be used for the treatment is generally 8,000-200,000 J/m$^2$, preferably 20,000-100,000 J/m$^2$. When the amount thereof is 8,000 J/m$^2$ or larger, the effect of flame treatment can be sufficiently obtained and the subsequent application of a surface modifier does not result in cissing. On the other hand, even when the energy amount is increased beyond 200,000 J/m$^2$, the effect of the treatment cannot be enhanced any more. Consequently, an energy amount up to 200,000 J/m$^2$ suffices for flame treatment.

The label can be used after having been subjected to gravure printing, offset printing, flexography, letterpress printing, screen printing, or the like to print a bar code, manufacturer's name, seller's name, character, trade name, usage, etc. thereon. It is also possible to impart design attractiveness by leaf putting, vapor deposition, laminating, etc. The label printed is separated by punching into labels of a necessary shape and dimensions. The label for in-mold forming thus obtained may be one to be bonded to part of the surface of a container. In general, however, the label is produced as a blank to be used for surrounding the side wall of a container of a cup shape or as a label to be bonded to the front side and/or back side of a bottle-shaped container in blow molding.

(In-Mold Forming)

The label for in-mold forming of the invention may be used in the following manners. The label is placed on the inner surface of the bottom female half of a mold for pressure-difference molding so that the printed side of the label is in contact with the mold surface. The label is then fixed to the inner wall of the mold half by suction. Subsequently, a sheet of a molten resin as a container-forming material is led to over the bottom female half and molded by pressure-difference molding in an ordinary manner to form a labeled container which has the label integrally fusion-bonded to the outer wall of the container. Although the pressure-difference molding may be either vacuum forming or pressure forming, it is generally preferred to conduct pressure-difference molding comprising a combination of the two molding techniques and utilizing plug assisting. This label is especially suitable for use as an in-mold label for blow molding in which a parison of a molten resin is pressed against the inner wall of a mold by pressurized air. In this process, the label is fixed in the mold and then united with the resin container being molded. Because of this, the labeled container thus produced is free from label deformation, has tenacious adhesion between the container main body and the label, and suffers no blistering. Thus, a container with a satisfactory appearance decorated with the label is obtained.

EXAMPLES

The invention will be illustrated in greater detail by reference to the following Production Examples, Examples, and Test Examples. The materials, use amounts, proportions, details of treatments, treatment procedures, etc. shown in the following Examples can be suitably modified as long as the modifications do not depart from the spirit of the invention. Consequently, the scope of the invention should not be construed as being limited to the following embodiments.

In the Production Examples, Examples, and Comparative Examples, the proportion of the heat of fusion in a range of temperatures below 90° C. was determined with a DSC in the following manner. The DSC used was EXSTAR Type 6000, manufactured by SII Nano Technology Inc. In a nitrogen gas atmosphere having a flow rate of 30 mL/min, 5 mg of a sample weighed out was melted by heating from ordinary temperature to 300° C. at a heating rate of 10° C./min, held at 300° C. for 3 minutes, subsequently cooled to −60° C. at a cooling rate of 10° C./min to crystallize the sample, and then heated to 300° C. at a heating rate of 10° C./min to melt it. During the final heating, the heat of fusion was measured. The proportion of the heat of fusion in the range of temperatures below 90° C. was determined using the following equation (1).

Proportion of heat of fusion in range of temperatures below 90° C. (%)=100×(heat of fusion in range of temperatures below 90° C.)/(overall heat of fusion)  (1)

Average surface roughness Ra was measured with a surface roughness meter (Surfcorder SE-30, manufactured by Kosaka Laboratory Ltd.). MFR and density were measured in accordance with JIS-K-6760 and JIS-K-7112, respectively.

The values of opacity were obtained through a measurement in accordance with JIS-Z-8722.

<Production Example 1> Production of Label (1)

A resin composition (A) (shown in Table 2) composed of 70 parts by weight of PP1 described in Table 1, 10 parts by weight of HDPE described in Table 1, and 20 parts by weight of calcium carbonate described in Table 1 was melt-kneaded with an extruder and then extruded at 250° C. through a die into a sheet form. This sheet was cooled to about 50° C. This sheet was reheated to about 150° C. and then longitudinally stretched in a stretch ratio of 4 by means of peripheral-speed differences among rolls. Thus, a uniaxially stretched film was obtained.

On the other hand, a composition (B) (shown in Table 2) composed of 45 parts by weight of PP2 described in Table 1, 5 parts by weight of the HDPE, and 50 parts by weight of the calcium carbonate was melt-kneaded with an extruder at 240° C. This melt was extruded through a die into a film form and superposed on a surface of the longitudinally stretched film. Thus, a front layer/core layer laminate (B/A) was obtained.

The composition (B) and pellets for heat-sealable resin layer formation (II-a) (shown in Table 2) consisting of 100 parts by weight of αPE1 described in Table 1 were separately melt-kneaded at 230° C. with respective extruders. The two melts were fed to one coextrusion die and superposed within the die. Thereafter, the resultant layered structure (B/II-a) was extruded into a film form through the die at 230° C. and laminated to the layer A side of the front layer/core layer laminate (B/A) so that the heat-sealable resin layer (II-a) faced outward. Thus, a laminate (B/A/B/II-a) was obtained.

This sheet was heated to 120° C. and then passed through embossing rolls comprising a metallic roll and a rubber roll (reversed-gravure type having 120 lines per inch) to form an embossed pattern comprising lines arranged at an interval of 0.21 mm on the heat-sealable resin layer side.

This four-layer film (B/A/B/II-a) was introduced into a tenter oven, heated to 155° C., and then stretched in the transverse direction with a tenter in a stretch ratio of 7. Subsequently, the film was annealed at 164° C., cooled to 55° C., and trimmed. Furthermore, the front layer (layer B) side was subjected to corona discharge treatment at 50 W·min/m². Thus, a stretched resin film having a four-layer structure was obtained, which had a density of 0.78 g/cm³ and a thickness of 100 μm (B/A/B/II-a=30 μm/40 μm/25 μm/5 μm). The average surface roughness (Ra) of this film on the heat-sealable layer (II-a) side was 2.4 Wm. The opacity of the film as measured in accordance with JIS-Z-8722 was 92%. The stretched resin film obtained by the process described above was cut to thereby obtain a label (1).

TABLE 1

| Ingredient | Kind | Details | Density (g/cm³) | Melting point (° C.) | Proportion of heat of fusion below 90° C. (%) |
|---|---|---|---|---|---|
| Thermo-plastic resin | Propylene homopolymer 1 (PP1) | [trade name Novatec PP: FY4; Japan Polypropylene Corp.] (MFR (230° C., 2.16-kg load) = 5 g/10 min) | 0.90 | 164 | 0 |
| | Propylene homopolymer 2 (PP2) | [trade name Novatec PP: MA3; Japan Polypropylene Corp.] (MFR (230° C., 2.16-kg load) = 11 g/10 min) | 0.90 | 165 | 0 |
| | High-density polyethylene (HDPE) | [trade name Novatec HD: HJ580; Japan Polyethylene Corp.] (MFR (190° C., 2.16-kg load) = 11 g/10 min) | 0.96 | 134 | 0 |
| | α-Olefin-containing ethylene copolymer (αPE1) | [trade name Engage: 8401; Dow Chemical Ltd.] (MFR (190° C., 2.16-kg load) = 30 g/10 min) | 0.89 | 78 | 100 |

TABLE 1-continued

| Ingredient | Kind | Details | Density (g/cm³) | Melting point (° C.) | Proportion of heat of fusion below 90° C. (%) |
|---|---|---|---|---|---|
| | α-Olefin-containing ethylene copolymer (αPE2) | [trade name Excellen FX: CX5508; Sumitomo Chemical Ltd.] (MFR (190° C., 2.16-kg load) = 75 g/10 min) | 0.89 | 79 | 95 |
| | α-Olefin-containing ethylene copolymer (αPE3) | [trade name Kernel: KS560T; Japan Polyethylene Corp.] (MFR (190° C., 2.16-kg load) = 17 g/10 min) | 0.90 | 90 | 80 |
| | Low-density polyethylene (LDPE) | [trade name Novatec LD: LC706; Japan Polyethylene Corp.] (MFR (190° C., 2.16-kg load) = 12 g/10 min) | 0.92 | 103 | 50 |
| Inorganic fine powder | Calcium carbonate (CaCO₃) | heavy calcium carbonate having average particle diameter of 1.0 μm and specific surface area of 22,000 cm²/g [trade name Softon 2200; Bihoku Funka Kogyo Co., Ltd.] | 2.7 | — | — |

TABLE 2

| | | Thermoplastic resin | | | | | | | Inorganic fine powder Calcium carbonate | Proportion of heat of fusion |
|---|---|---|---|---|---|---|---|---|---|---|
| | | Propylene homopolymer | | High-density polyethylene | α-Olefin-containing ethylene copolymer | | | | Low-density polyethylene | powder (particle diameter, | below 90° C. |
| | | PP1 | PP2 | HDPE | αPE1 | αPE2 | αPE3 | αPE4 | LDPE | 1.0 μm) CaCO₃ | (%) |
| Resin composition (A) | | 70 parts by weight | — | 10 parts by weight | — | — | — | — | — | 20 parts by weight | — |
| Resin composition (B) | | — | 45 parts by weight | 5 parts by weight | — | — | — | — | — | 50 parts by weight | — |
| Resin composition (C) | | 89 parts by weight | — | 10 parts by weight | — | — | — | — | — | 1 part by weight | — |
| Resin composition (D) | | — | 85 parts by weight | 5 parts by weight | — | — | — | — | — | 10 parts by weight | — |
| Resin composition (E) | | — | 93 parts by weight | 5 parts by weight | — | — | — | — | — | 2 parts by weight | — |
| Pellets for heat-sealable resin layer (II) | II-a | — | — | — | 100 parts by weight | — | — | — | — | — | 100 |
| | II-b | — | — | — | 65 parts by weight | — | — | — | 35 parts by weight | — | 74 |
| | II-c | — | — | — | 60 parts by weight | — | — | — | 40 parts by weight | — | 71 |
| | II-d | — | — | — | — | 65 parts by weight | — | — | 35 parts by weight | — | 72 |
| | II-e | — | — | — | 55 parts by weight | — | — | — | 45 parts by weight | — | 69 |
| | II-f | — | — | — | — | — | 80 parts by weight | — | 20 parts by weight | — | 71 |
| | II-g | — | — | — | — | — | — | — | 100 parts by weight | — | 50 |

<Production Example 2> Production of Label (2)

A stretched resin film was obtained in the same manner as in Production Example 1, except that pellets for heat-sealable resin layer formation (II-b) (shown in Table 2) composed of 65 parts by weight of the αPE1 and 35 parts by weight of LDPE described in Table 1 were melt-kneaded at 200° C. with a twin-screw extruder and extruded into a strand form through a die to obtain a heat-sealable resin layer. The stretched resin film obtained was cut to thereby obtain a label (2).

<Production Example 3> Production of Label (3)

A resin composition (C) (shown in Table 2) composed of 89 parts by weight of the PP1, 10 parts by weight of HDPE described in Table 1, and 1 part by weight of calcium carbonate described in Table 1 was melt-kneaded with an extruder and then extruded at 250° C. through a die into a sheet form. This sheet was cooled to about 50° C. This sheet was reheated to about 150° C. and then longitudinally stretched in a stretch ratio of 4 by means of peripheral-speed differences among rolls. Thus, a uniaxially stretched film was obtained.

On the other hand, a composition (D) (shown in Table 2) composed of 85 parts by weight of the PP2, 5 parts by weight of the HDPE, and 10 parts by weight of the calcium carbonate was melt-kneaded with an extruder at 240° C. This melt was extruded through a die into a film form and superposed on a surface of the longitudinally stretched film. Thus, a front layer/core layer laminate (D/C) was obtained.

Furthermore, a composition (E) (shown in Table 2) composed of 93 parts by weight of the PP2, 5 parts by weight of the HDPE, and 2 parts by weight of the calcium carbonate was obtained by melt-kneading the ingredients with a twin-screw extruder at 200° C., extruding the melt through a die into strands, and cutting the strands.

A stretched resin film was obtained in the same manner as in Production Example 1, except the following. The composition (E) and the pellets for heat-sealable resin layer formation (II-b) were separately melt-kneaded at 230° C. with respective extruders. The two melts were fed to one coextrusion die and superposed within the die. Thereafter, the resultant layered structure (E/II-b) was extruded into a film form through the die at 230° C. and laminated to the layer C side of the front layer/core layer laminate (D/C) so that the heat-sealable resin layer (II-b) faced outward. Thus, a laminate (D/C/E/II-b) was obtained. The stretched resin film obtained was cut to thereby obtain a label (3).

<Production Example 4> Production of Label (4)

A stretched resin film was obtained in the same manner as in Production Example 1, except that pellets for heat-sealable resin layer formation (II-c) (shown in Table 2) composed of 60 parts by weight of the αPE1 and 40 parts by weight of the LDPE were melt-kneaded at 200° C. with a twin-screw extruder and extruded into a strand form through a die to obtain a heat-sealable resin layer. The stretched resin film obtained was cut to thereby obtain a label (4).

<Production Example 5> Production of Label (5)

A stretched resin film was obtained in the same manner as in Production Example 1, except that pellets for heat-sealable resin layer formation (II-d) (shown in Table 2) composed of 65 parts by weight of αPE2 and 35 parts by weight of the LDPE were melt-kneaded at 200° C. with a twin-screw extruder and extruded into a strand form through a die to obtain a heat-sealable resin layer. The stretched resin film obtained was cut to thereby obtain a label (5).

<Production Example 6> Production of Label (6)

A stretched resin film was obtained in the same manner as in Production Example 1, except that pellets for heat-sealable resin layer formation (II-e) (shown in Table 2) composed of 55 parts by weight of the αPE1 and 45 parts by weight of the LDPE were melt-kneaded at 200° C. with a twin-screw extruder and extruded into a strand form through a die to obtain a heat-sealable resin layer. The stretched resin film obtained was cut to thereby obtain a label (6).

<Production Example 7> Production of Label (7)

A stretched resin film was obtained in the same manner as in Production Example 1, except that pellets for heat-sealable resin layer formation (II-f) (shown in Table 2) composed of 80 parts by weight of αPE3 and 20 parts by weight of the LDPE were melt-kneaded at 200° C. with a twin-screw extruder and extruded into a strand form through a die to obtain a heat-sealable resin layer. The stretched resin film obtained was cut to thereby obtain a label (7).

<Production Example 8> Production of Label (8)

A stretched resin film was obtained in the same manner as in Production Example 1, except that pellets for heat-sealable resin layer formation (II-g) (shown in Table 2) consisting of 100 parts by weight of the LDPE were melt-kneaded at 200° C. with a twin-screw extruder and extruded into a strand form through a die to obtain a heat-sealable resin layer. The stretched resin film obtained was cut to thereby obtain a label (8).

<Examples 1 to 5 and Comparative Examples 1 to 3>

In Examples 1 to 5 according to the invention, the labels (1) to (5) obtained in Production Examples 1 to 5 were used to mold labeled resin containers under the following conditions. In Comparative Examples 1 to 3, the labels (6) to (8) obtained in Production Examples 6 to 8 were used to mold labeled resin containers under the same conditions.

For molding standard resin containers for evaluation in each of the Examples according to the invention and the Comparative Examples, an ethylene homopolymer (Novatec PE "HB321R", manufactured by Japan Polyethylene Corp.; melt flow rate at 190° C. and 2.16-kg load, 0.2 g/10 min; density, 0.953 g/cm$^3$) was used as the material for the resin containers and a mold for a 3-L container was used. A large direct-blow molding machine (TPF-706B, manufactured by TAHARA Machinery Ltd.) was used for the molding.

The molding of standard resin containers for evaluation was conducted by the following method.

Each of the labels obtained in the Production Examples, which are described in Table 3, is inserted with an automatic inserter into the cavity of a split mold so that the label on its side opposite to the heat-sealable layer is in contact with the inner surface of the barrel part of the mold. The label is fixed by suction through a suction hole of the mold. Subsequently, the resin container material is melt-kneaded in an extruder and extruded into a cylindrical shape through a die to form a molten parison. The temperature of the parison is regulated to 200° C. The gap between the lips of the die is regulated so as to adjust the weight of the resin container itself to 120 g and the container wall thickness to 1 mm. Finally, the parison is introduced into the mold and the mold is clamped. Compressed air is supplied into the parison to thereby expand the parison and bring it into intimate contact with the mold. The parison is thus formed into a container shape and, simultaneously therewith, is fusion-bonded to the label for in-mold forming to complete the molding of a labeled single-layer resin container.

In the label bonding, the label was set so that the transverse direction for the label (the direction in which stretching with a tenter was conducted in label formation) was parallel to the neck/bottom direction for the container (the direction of parison formation). Furthermore, the mold was cooled while regulating the cooling-water temperature to 20° C.

The resin containers obtained were evaluated for suitability for practical use with respect to blistering. The suitability was judged based on the following criteria. Ten containers were evaluated for each Example or Comparative Example, and the results obtained are shown in Table 3.

A: blistering occurred in none or one of the ten containers (on practical level)

B: blistering occurred in two or three of the ten containers (on practical level)

C: blistering occurred in four to seven of the ten containers (not on practical level)

D: blistered occurred in eight to ten of the ten containers (not on practical level)

Each of the resin containers obtained by the method described above was evaluated for adhesion strength between the label and the container. The label bonded to the container was cut, together with the container, into a width of 15 mm to obtain a sample for adhesion strength measurement. The label/container adhesion strength of the sample was measured at 23° C. and at 90° C. with tensile tester "Autograph Type AGS-D", manufactured by Shimadzu Corp., and thermostatic chamber for tensile testers "TCF-R2T", manufactured by MECC Co., Ltd. Each test sample was conditioned by placing it in the thermostatic chamber at either of the temperatures for 5 minutes and then subjected to T-peel with the tensile tester at a pulling rate of 300 mm/min. The peel strength corresponding to the yield point was taken as the adhesion strength. The results obtained are shown in Table 3.

B: 20-50% of the label remains on the container (on practical level)

C: 50-80% of the label remains on the container (not on practical level)

D: 80-100% of the label remains on the container (not on practical level)

TABLE 3

| | Evaluation item | Unit | Example 1 | Example 2 | Example 3 | Example 4 | Example 5 | Comparative Example 1 | Comparative Example 2 | Comparative Example 3 |
|---|---|---|---|---|---|---|---|---|---|---|
| Label | Label bonded | — | label (1) | label (2) | label (3) | label (4) | label (5) | label (6) | label (7) | label (8) |
| | Pellets for core layer | — | resin composition (A) | resin composition (A) | resin composition (C) | resin composition (A) | resin composition (A) | resin composition (A) | resin composition (A) | resin composition (A) |
| | Pellets for heat-sealable resin layer | — | II-a | II-b | II-b | II-c | II-d | II-e | II-f | II-g |
| | Thickness | μm | 100 | 100 | 100 | 100 | 100 | 100 | 100 | 100 |
| | Density | g/cm³ | 0.78 | 0.78 | 0.91 | 0.78 | 0.78 | 0.78 | 0.78 | 0.78 |
| | Opacity | % | 92 | 92 | 16 | 92 | 92 | 92 | 92 | 92 |
| | Average surface roughness on heat-sealable layer side, Ra | μm | 2.4 | 2.5 | 2.5 | 2.5 | 2.5 | 2.5 | 2.6 | 2.6 |
| Evaluation of practical performance | Blistering inhibition in large-size direct blow molding | — | A | A | A | A | A | A | A | B |
| | Label adhesion at 23° C. | — | A | A | B | A | A | A | A | B |
| | | Adhesion strength (gf/15 mm) | 800 | 650 | 400 | 630 | 630 | 630 | 650 | 450 |
| | Suitability for delabeling at 90° C. | — | A | A | A | A | A | C | D | C |
| | | Adhesion strength (gf/15 mm) | 50 | 200 | 150 | 280 | 250 | 350 | 500 | 420 |

In general, adhesion strength between a label and a resin container is governed by various factors including: the materials of the heat-sealable resin and container resin used (material properties); amounts of materials used, such as the thickness of each layer of the label and the weight of the resin container itself; and conditions such as parison temperature, mold temperature, and air pressure in parison expansion. Although the adhesion strength in the invention is determined by the method described above, the scope of the invention should not be construed as being limited to embodiments in which the adhesion strength is determined by the method.

In the label peel test at 23° C., the state of the label which had undergone peeling from the container was judged based on the following criteria. The results obtained are shown in Table 3.

A: 80-100% of the label remains on the container (on practical level)

B: 50-80% of the label remains on the container (on practical level)

C: 20-50% of the label remains on the container (not on practical level)

D: 0-20% of the label remains on the container (not on practical level)

In the label peel test at 90° C., the state of the label which had undergone peeling from the container was judged based on the following criteria. The results obtained are shown in Table 3.

A: 0-20% of the label remains on the container (on practical level)

According to the invention, a labeled container inhibited from suffering blistering in in-mold forming and a label for in-mold forming which has satisfactory suitability for high-temperature delabeling are obtained.

While the invention has been described in detail and with reference to specific embodiments thereof, it will be apparent to one skilled in the art that various changes and modifications can be made therein without departing from the spirit and scope thereof.

What is claimed is:

1. A label for in-mold forming, comprising:
   a thermoplastic resin film base layer (I); and
   a heat-sealable resin layer (II);
   wherein:
   the heat-sealable resin layer (II) comprises a copolymer of ethylene and an α-olefin having 3 to 20 carbon atoms;
   the heat-sealable resin layer (II) has an adhesion strength as measured at 23° C. of 300 gf/15 mm or higher;
   the heat-sealable resin layer (II) has an adhesion strength as measured at 90° C. of 290 gf/15 mm or lower;
   the heat-sealable resin layer (II) has a proportion of heat of fusion in a range of temperatures below 90° C. of 70% or higher as determined with a differential scanning calorimeter (DSC); and
   the copolymer of the heat-sealable resin layer (II) has a melting point of 50-90° C.

2. The label for in-mold forming of claim 1, which is strippable by heating a container to which the label has been bonded to 90° C.

3. The label for in-mold forming of claim 1, wherein the copolymer of the heat-sealable resin layer (II) has a proportion of heat of fusion in a range of temperatures below 90° C. of 90% or higher.

4. The label for in-mold forming of claim 1, which comprises the thermoplastic resin film base layer (I) and the heat-sealable resin layer (II) formed on one side of the base layer (I) and is to be bonded and united to a container through the heat-sealable resin layer (II).

5. The label for in-mold forming of claim 4, wherein the thermoplastic resin film base layer (I) is a uniaxially stretched layer.

6. The label for in-mold forming of claim 4, wherein the thermoplastic resin film base layer (I) is a biaxially stretched layer.

7. The label for in-mold forming of claim 4, wherein the thermoplastic resin film base layer (I) comprises a combination of a biaxially stretched layer and a uniaxially stretched layer.

8. The label for in-mold forming of claim 4, wherein the heat-sealable resin layer (II) is a layer which has been stretched at least uniaxially.

9. The label for in-mold forming of claim 4, wherein the heat-sealable resin layer (II) has been embossed.

10. The label for in-mold forming of claim 4, wherein the heat-sealable resin layer (II) is a layer formed through coating.

11. The label for in-mold forming of claim 1, wherein the label is opaque.

12. The label for in-mold forming of claim 1, wherein the label is transparent.

13. The label for in-mold forming of claim 1, comprising at least one of a hole and a slit.

14. A labeled resin container bearing the label for in-mold forming of claim 1 bonded thereto.

15. A process for producing the label for in-mold forming of claim 1, which comprises superposing the thermoplastic resin film base layer (I) and the heat-sealable resin layer (II) one on the other by a casting method in which these layers are coextruded through a multilayer die and then stretching the extrudate.

16. A process for producing the label for in-mold forming of claim 1, which comprises superposing the thermoplastic resin film base layer (I) and the heat-sealable resin layer (II) one on the other by a laminating method using plural dies and then stretching the laminate.

17. A process for producing the labeled resin container of claim 14, which comprises inserting the label for in-mold forming of claim 1 into a mold and then forming a container in the mold.

* * * * *